May 25, 1926.

E. L. CLARKE

MASSAGE IMPLEMENT

Filed June 28, 1924

1,585,767

INVENTOR
Eleanor L. Clarke
BY
Redding, Greeley, O'Shea Campbell
ATTORNEYS

Patented May 25, 1926.

1,585,767

UNITED STATES PATENT OFFICE.

ELEANOR L. CLARKE, OF BROOKLYN, NEW YORK.

MASSAGE IMPLEMENT.

Application filed June 28, 1924. Serial No. 722,918.

The object of this invention is to produce a device or implement which can be used to advantage in stimulating the skin and the underlying tissues, particularly about the face and neck. Various implements have been devised heretofore which embody rollers, either spherical or cylindrical, which are intended to be moved over the surface of the body and to massage the deeper tissues as well as the more superficial tissues. The purpose of the present invention is, however, altogether different. In the first place, these implements of the prior art have more or less of a drawing action on the surface tissues which, for the purposes in view in the present case is undesirable, for they lack the vibratory action of the implement now to be described and therefore lack in large measure the stimulating action on the skin and the closely adjacent tissues, and especially on the blood vessels therein, which it is the particular purpose to accomplish. Use of the device not only stimulates the blood cells, promotes healthy circulation, so exercises the superficial muscles as to prevent the formation of deep lines or wrinkles, and can be used freely even about the eyes without harmful action on the nerves, cleanses the pores, and improves the texture of the skin, but avoids the undesirable stretching of the skin and muscles which is often the harmful result of improper massage. The invention will be described more fully hereinafter with reference to the accompanying drawing in which it is illustrated and in which—

Figure 1:
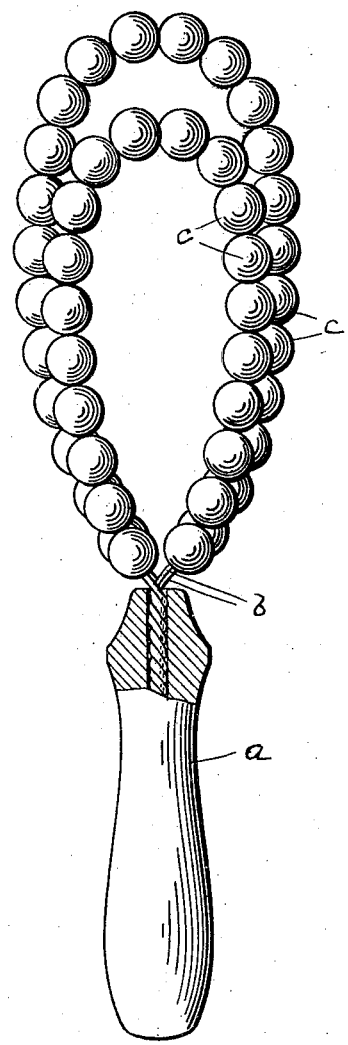
Figure 2:
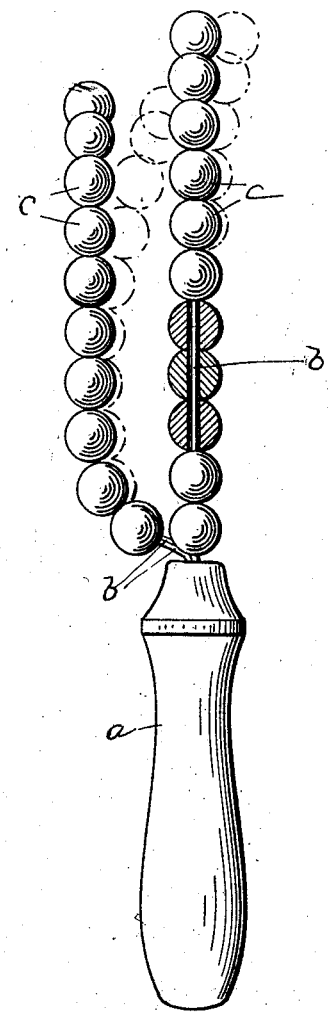

Figure 1 is a view in elevation of the improved implement, with a portion of the handle in section and Figure 2 is a view of the same as seen from the right hand in Figure 1, with some of the balls in section.

The implement comprises a suitable handle $a$, which can be grasped conveniently by the hand of the user, one or more wire loops $b$, $b$, having the ends of the looped wire secured in the handle, and many relatively small, rolling bodies $c$, $c$ perforated axially and mounted on the wires $b$ so that they rotate freely thereon. The wire loops $b$ are preferably elliptical in form and the rolling bodies cover the loop completely so that the rolling bodies can be brought into contact with different portions of the face and neck and, if the implement comprises more than one loop and set of rolling bodies the several loops are preferably of different sizes as shown, and are offset, by bending the wires, in different planes. It is important that the wires shall be resilient rather than rigid in order that the desired vibratory action shall be produced. The rolling bodies $c$ are preferably spherical so as to contact with the surface in such a manner as to promote the vibratory action and to avoid the drawing and kneading action of long rollers rigidly supported. They are also, for the same reasons, preferably small in diameter and are distributed uniformly over the entire length of each resilient wire loop so that, for example, the balls at the outer ends of the loops can be brought into contact with the surface about the eyes and under the jaws while the balls along the sides of the loops can be used to better advantage for contact with the broader surfaces of the cheeks and neck.

In use the implement, held in one hand, is passed lightly over the surface to be treated and, by reason of the multiplicity of relatively small rolling bodies and their resilient support, will be found to have a vibratory action and thereby to stimulate the surface tissues without undesirable drawing action.

In the construction set forth it will also be seen that if it is desired to massage the arm or the neck or other parts of the body both sides may be treated at the same time by placing one loop on one side while the other loop will be placed against the opposite side and movement of the device will massage both surfaces.

I claim as my invention:

1. In a massage implement, the combination of a pair of elliptically shaped wire members spaced apart and extending parallel with each other, said members being twisted together at one end and adapted to fit within a handle, and rollers provided with apertures adapted to receive said wire members therein and to rotate freely thereon.

2. In a massage implement, the combination of a pair of elliptically shaped wire members spaced apart and extending parallel with each other, said members being twisted together at one end and adapted to fit within a handle, a plurality of rollers adapted to rest against one another and provided with apertures therethrough to receive said wire members therein, said rollers adapted to rotate freely thereon.

3. In a massage implement, the combination of a pair of elliptically shaped wire members spaced apart and extending parallel with each other, one member having a substantially smaller circumference than the other, said members being twisted together at one end and adapted to fit within a handle, and rollers provided with an aperture adapted to receive said wire members therein, and to rotate freely thereon.

4. In a massage implement, the combination of a pair of elliptically shaped wire members, spaced apart and extending parallel with each other, one member having a substantially smaller circumference than the other, said members being twisted together at one end and adapted to fit within a handle, a plurality of rollers adapted to rest against one another and provided with an aperture therethrough to receive said wire member therein, said rollers adapted to rotate freely thereon.

This specification signed this 25th day of June, A. D. 1924.

ELEANOR L. CLARKE.